United States Patent
Ahn

(10) Patent No.: US 7,366,119 B2
(45) Date of Patent: Apr. 29, 2008

(54) DATA RECEIVING AND TRANSMITTING METHOD WITH CODING TYPE DETERMINATION

(75) Inventor: Hee Jun Ahn, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 869 days.

(21) Appl. No.: 10/192,895

(22) Filed: Jul. 11, 2002

(65) Prior Publication Data

US 2003/0012201 A1 Jan. 16, 2003

(30) Foreign Application Priority Data

Jul. 12, 2001 (KR) .......................... 10-2001-41895

(51) Int. Cl.
*H04B 7/00* (2006.01)

(52) U.S. Cl. .................................................. 370/310

(58) Field of Classification Search ................ 370/216, 370/310, 328, 329, 342, 345, 464–469; 455/8–10, 455/423, 226.1–228

See application file for complete search history.

(56) References Cited

U.S. PATENT DOCUMENTS

| | | | |
|---|---|---|---|
| 4,939,731 A * | 7/1990 | Reed et al. .................. | 714/748 |
| 5,210,751 A | 5/1993 | Onoe et al. | |
| 5,729,557 A * | 3/1998 | Gardner et al. ............. | 714/774 |
| 5,757,813 A * | 5/1998 | Raith .......................... | 714/708 |
| 5,983,382 A * | 11/1999 | Pauls .......................... | 714/744 |
| 6,208,663 B1 * | 3/2001 | Schramm et al. ........... | 370/465 |
| 6,289,054 B1 * | 9/2001 | Rhee ...................... | 375/240.27 |
| 6,317,418 B1 * | 11/2001 | Raitola et al. .............. | 370/278 |
| 6,353,907 B1 * | 3/2002 | van Nobelen ............... | 714/746 |
| 6,389,066 B1 * | 5/2002 | Ejzak .......................... | 375/224 |
| 6,414,938 B1 * | 7/2002 | Corke et al. ................ | 370/231 |
| 6,507,582 B1 * | 1/2003 | Abrol ......................... | 370/394 |
| 6,529,561 B2 * | 3/2003 | Sipola ........................ | 375/295 |
| 6,539,205 B1 * | 3/2003 | Wan et al. .................. | 370/465 |

FOREIGN PATENT DOCUMENTS

| | | |
|---|---|---|
| WO | WO 99/12304 | 3/1999 |
| WO | WO 99/49610 | 9/1999 |
| WO | WO 00/25469 | 5/2000 |
| WO | WO 01/20837 A1 | 3/2001 |

\* cited by examiner

*Primary Examiner*—Dmitry Levitan
(74) *Attorney, Agent, or Firm*—Lee, Hong, Degerman, Kang & Schmadeka

(57) ABSTRACT

Disclosed is a data communication system transmitting data using adaptive modulation at an acknowledged data transfer mode simultaneously. The present invention includes a first step of monitoring variation of radio environments by a receiving end receiving packets sequentially, a second step of determining a coding type to be varied in accordance with the variation of the radio environments in the receiving end so as to inform a transmitting end of the determined coding type, and a third step of forwarding sequentially the corresponding packets with a transfer rate in accordance with the determined coding type in the transmitting end.

10 Claims, 6 Drawing Sheets

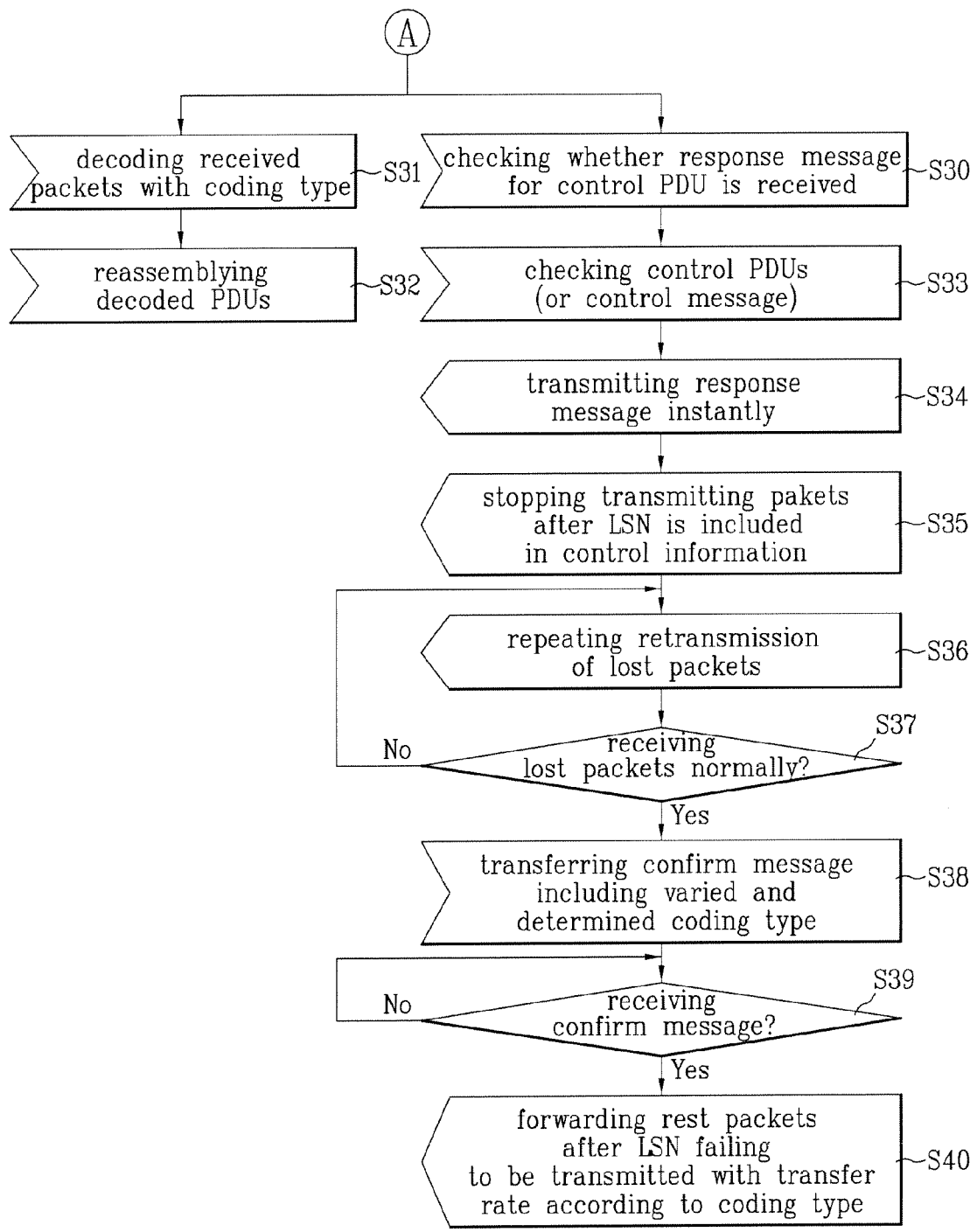
FIG. 5 (Continuation)

DATA RECEIVING AND TRANSMITTING METHOD WITH CODING TYPE DETERMINATION

This application claims the benefit of the Korean Application No. P2001-41895 filed on Jul. 12, 2001, which is hereby incorporated by reference.

BACKGROUND OF THE INVENTION

1. Field of the Invention

The present invention relates to a next generation mobile communication system, and more particularly, to a data communication system transmitting data using adaptive modulation at an acknowledged data transfer mode simultaneously.

2. Discussion of the Related Art

Generally, a protocol for realizing a data communication system is divided into first, second, third, . . . and higher layers.

The first layer is a physical layer, in which encoding/decoding of data, rate matching, modulation/demodulation, spreading/dispreading and the like are defined.

The second layer includes two sub-layers such as a MAC(medium access control) layer and a RLC(radio link control) layer.

The MAC layer provides services such as data transfer, reporting of measurements(such as traffic volume, quality indication, etc.), and allocation/deallocation of radio resources.

And, the RLC layer provides services such as connection establishment/release of radio link, transparent data transfer, unacknowledged data transfer, acknowledged data transfer, QoS(quality of service) setting, notification of unrecoverable errors, and multicast delivery of higher layer messages.

And, the third layer includes a RRC(radio resource control) layer.

Data communication comes true by the services of the above-mentioned protocol layers.

Specifically, the unacknowledged data transfer and acknowledged data transfer of the services provided by the RLC layer of the second layer determine a transfer mode of data communication.

The acknowledged data mode guarantees the security of data transfer, and is ensured by means of retransmission.

In aspect of tendency of the latest standardization of data communication, widely is a method of varying a data rate by changing a coding type in accordance with radio environment so as to cope adaptively with the constantly varying radio environments. This is called adaptive modulation.

Yet, the related art has failed to propose a system realizing method considering both data transfer and adaptive modulation at the acknowledged data transfer simultaneously.

When information is transferred by applying adaptive modulation to a data communication system using the acknowledged data transfer mode, an effective transfer length is varied by the varying radio environments before one full information is completely transferred.

In this case, since the effective transfer length of data is varied, the system should form packets of new length. The system then retransmits the reformed packets.

In order to retransmit the reformed packets in the related art, the previously established radio link connection is released. After the packets for retransmission have been reformed, new radio link connection should be established. The release and establishment of the radio link are defined in the second layer.

In the related art, the radio link connection should be reestablished so as to guarantee the transmission security of single information, thereby bringing about inefficiency of transmission delay.

Besides, adaptive modulation should be applied in order not to establish the above radio link connection again. Nevertheless, the transmission delay of packets still occurs as well as the probability of error occurrence in the transmitted packets increases.

SUMMARY OF THE INVENTION

Accordingly, the present invention is directed to a data communication system that substantially obviates one or more problems due to limitations and disadvantages of the related art.

An object of the present invention is to provide a data communication system transmitting data to which adaptive modulation at an acknowledged data transfer mode is simultaneously applied by considering a data transfer rate varying in accordance with radio environments as well as guaranteeing security of data transfer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data communication method according to the present invention includes a first step of monitoring variation of radio environments by a receiving end receiving packets sequentially, a second step of determining a coding type to be varied in accordance with the variation of the radio environments in the receiving end so as to inform a transmitting end of the determined coding type, and a third step of forwarding sequentially the corresponding packets with a transfer rate in accordance with the determined coding type in the transmitting end.

In another aspect of the present invention, a data communication method includes a first step of monitoring a variation of radio environments in a receiving end receiving packets sequentially, a second step of having the receiving end determine a coding type to be varied in accordance with the variation of the radio environments if lost packets due to the variation of the radio environments exist, a third step of having the receiving end transmit a control message for informing a variation of the coding type and the lost packets to a transmitting end, and a fourth step of having the transmitting end retransmit the lost packets repeatedly after having transmitted a response message corresponding to the control message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a data flow formed by the definition of a data communication protocol is explained.

Figure 1:
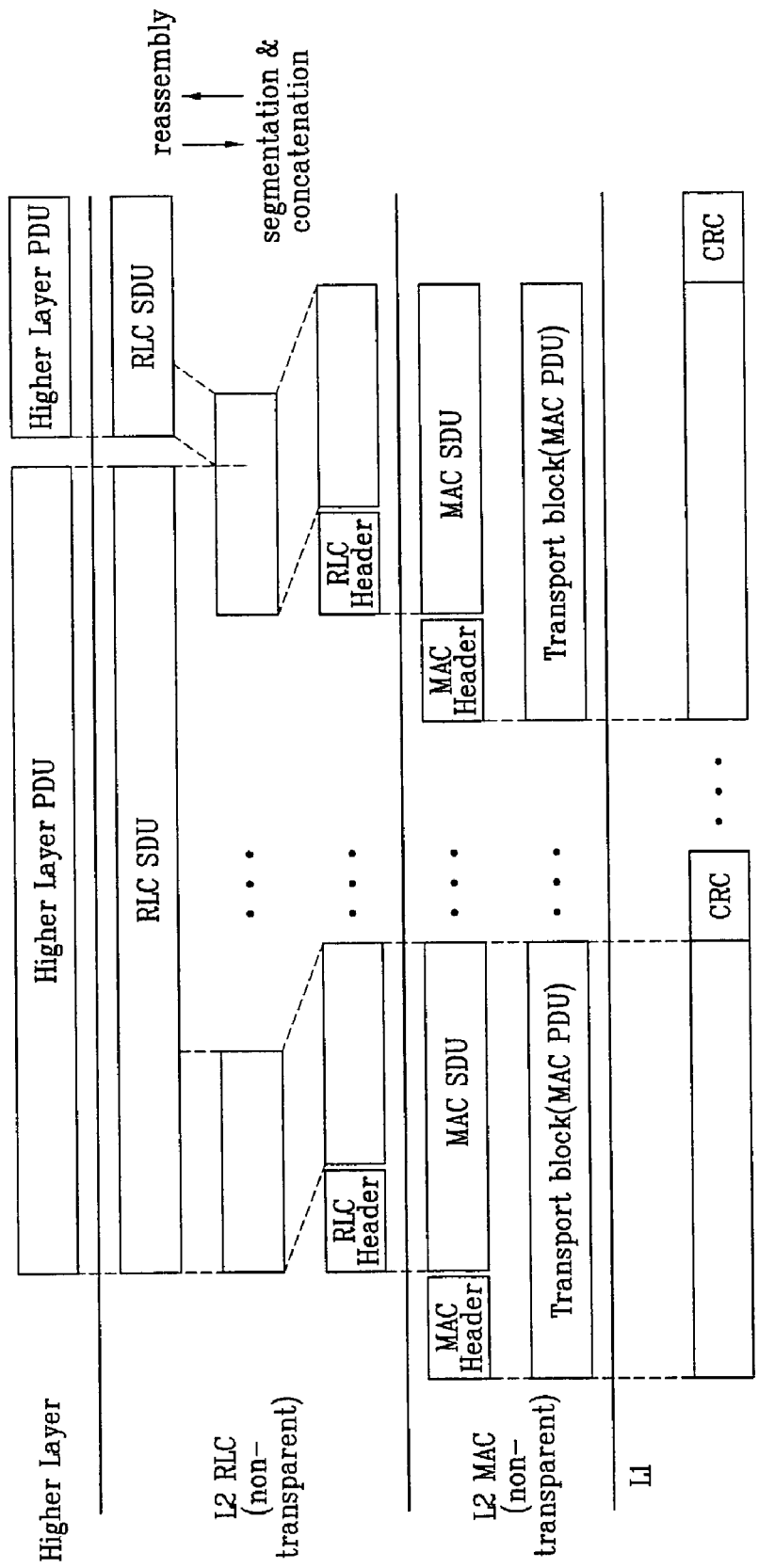
FIG. 1 illustrates a diagram of data flow in accordance with protocol definition of a data communication system.

FIG. 1 illustrates a diagram of data flow in accordance with protocol definition of a data communication system.

Referring to FIG. 1, specific information(control information and user information) that will be transferred is constituted with a single PDU(protocol data unit) defined in a higher layer.

The PDU of the higher layer is defined as a single SDU(service data unit) in a RLC layer, and the SDU is segmented into several PDUs. In this case, according whether the RLC layer is transparent or non-transparent, a RLC header is attached to the segmented header. Namely, RLC headers are attached to the segmented PDUs respectively only if the RLC layer is nontransparent. Besides, control information according to the characteristic of the RLC layer is inserted in the RLC header. For instance, inserted is the information for determining an order of the respective RLC PDUs according as the PDU formed in the higher layer is segmented into the several RLC PDUs.

Each of the PDUs of the RLC layer is defined as a single PDU in a MAC layer, and several transport blocks as PDU of the MAC layer are formed from the SDUs. In this case, according whether the MAC layer is transparent or non-transparent, a MAC header is attached to a MAC PDU. Namely, MAC headers are attached to the PDUs, respectively only if the MAC layer is nontransparent. And, control information according to the characteristic of the MAC layer is inserted in the MAC header.

Error check bits(CRC) are added to the transport blocks, respectively so as to form several packets defined in a first layer.

The formed packets are forwarded to a radio space.

A sequence number is given to each of the forwarded packets.

Such packets are generated in the forwarding process when a signal strength is attenuated due to the influence of radio environments or when a signal quality is degraded by interference, noise, and the like.

Accordingly, adaptive modulation for varying a transfer rate in accordance with the variety of the radio environments is applied thereto.

A data communication method based on the above-explained data flow according to the present invention is explained as follows. The explanation for the present invention is applied to both data transfers of upward link(from terminal to system) and downward link(from system to terminal).

Besides, the present invention applies an instant switching system or a delay response system suitable for the circumstances to a coding type relating to a data transfer rate, thereby securing the data transfer.

Figure 2:
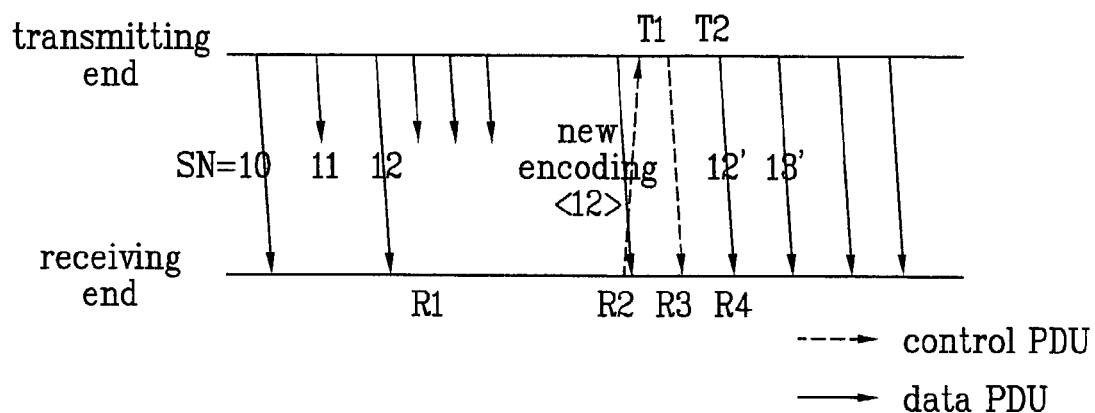
FIG. 2 illustrates a diagram for a data communication method of an instant switching system according to a first embodiment of the present invention.

FIG. 2 illustrates a diagram for a data communication method of an instant switching system according to a first embodiment of the present invention.

Shown in FIG. 2 is a case that packets, to which sequence numbers(hereinafter abbreviated SN), 0 to 15, are given, are forwarded using adaptive modulation.

Namely, shown is the case that a data transfer rate is changed while a twelfth packet among the packets forwarded from a transmitting end is being transferred. A receiving end determines the data transfer rate of the transmitting end for the variation of the radio environments so as to inform a transfer rate of data that will be transmitted.

In this case, the receiving end receives a varied coding type and application of the varied coding type so as to form a control PDU including control information to inform the transmitting end of a least sequence number(SN=2 in FIG. 2) among the packets to be retransmitted. The receiving end then transfers the control PDU to the transmitting end.

Subsequently, the transmitting end instantly transmits a response message corresponding to the received control PDU, and then transmits the packets(from SN=12 packet) to be retransmitted at the data transfer rate of the coding type informed by the receiving end.

In this case, the packets to be retransmitted are the packets failing to be received by the receiving end or the packets prior to the reassembled packets to be transferred from the second layer to the higher layer of the receiving end(i.e. packets failing to be reassembled).

Figure 3:
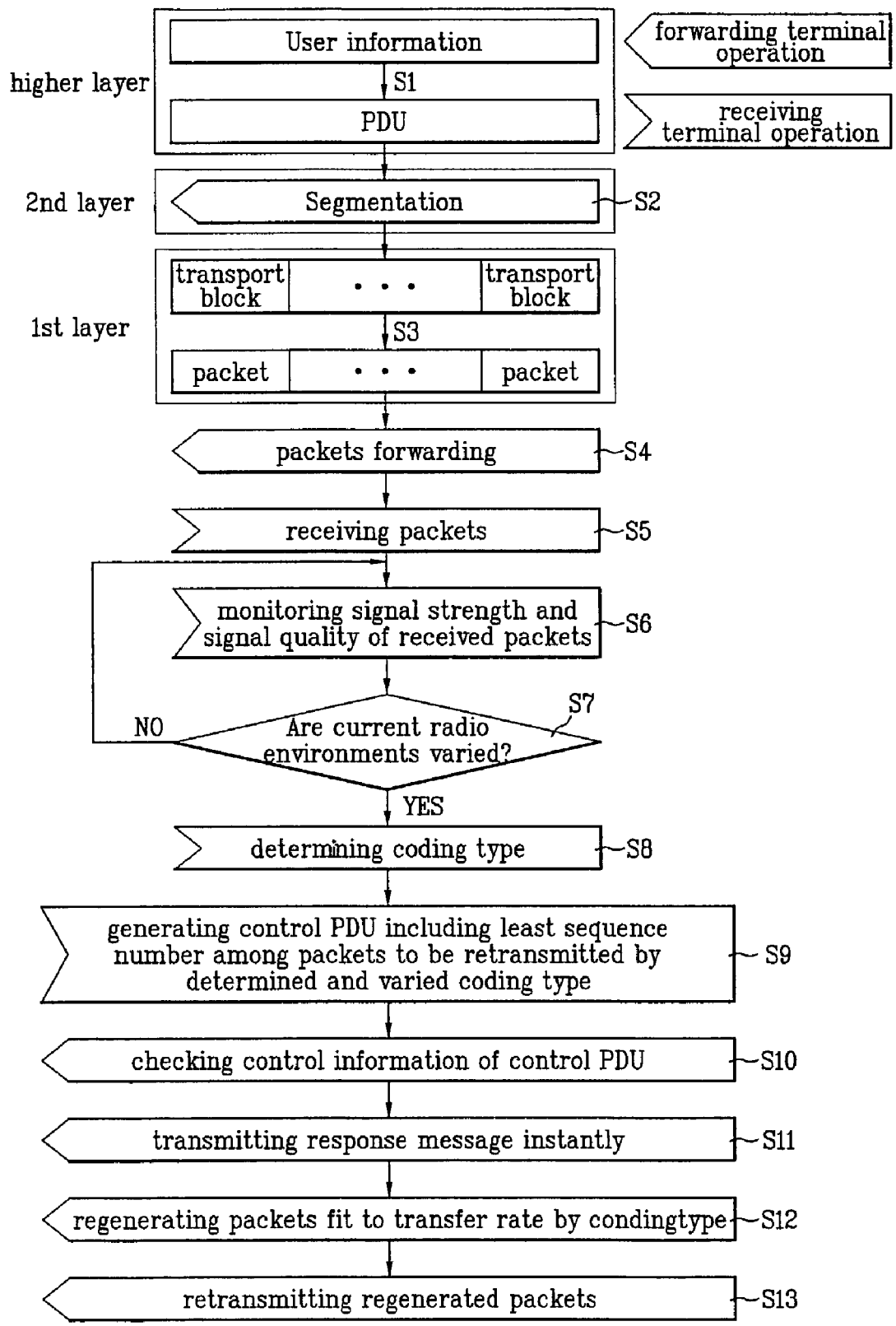
FIG. 3 illustrates a flowchart for a data communication method of an instant switching system according to a first embodiment of the present invention.

FIG. 3 illustrates a flowchart for a data communication method of an instant switching system according to a first embodiment of the present invention.

Referring to FIG. 3, information to be transferred(user information) undergoes segmentation of a second layer so as to be fit to a current transfer rate after having been formed into a single PDU(protocol data unit) defined in a higher layer(S1, S2).

Thereafter, a first layer in direct charge of information transmission forms transmission packets from transport blocks divided by the segmentation(S3).

And, the packets are transmitted to a receiving end with the current transfer rate(S4).

The receiving end monitors signal strength and signal quality of the received packets while receiving the packets from a transmitting end(S5, S6). And, the receiving end checks the variation of radio environments based on the monitoring.

If it is judged that the current radio environments are varied based on the signal strength and signal quality(S7), the receiving end determines a coding type suitable for the current radio environments(S8). This means that the receiving end determines the data transfer rate of the transmitting end.

The receiving end generates a control PDU(or control message) including a least sequence number among the packets to be retransmitted from the transmitting end by the determined and varied coding type and the variation of the coding type, and then transmits the control PDU to the transmitting end(S9).

Accordingly, the transmitting end checks control information included in the received control PDU, and then transmits a response message instantly to the receiving end(S10, S11).

First of all, the transmitting end then transmits the packet of the SN included in the control information to the receiving end(S13). In this case, the transmitting end regenerates packets fit to the transfer rate by the coding type informed by the receiving end, and then retransmits the regenerated packets(S12, S13).

In this case, the packets to be retransmitted are the packets failing to be received by the receiving end or the packets(i.e. packets failing to be reassembled) following the reassembled packets to be transferred from the second layer to the higher layer of the receiving end.

Figure 4:
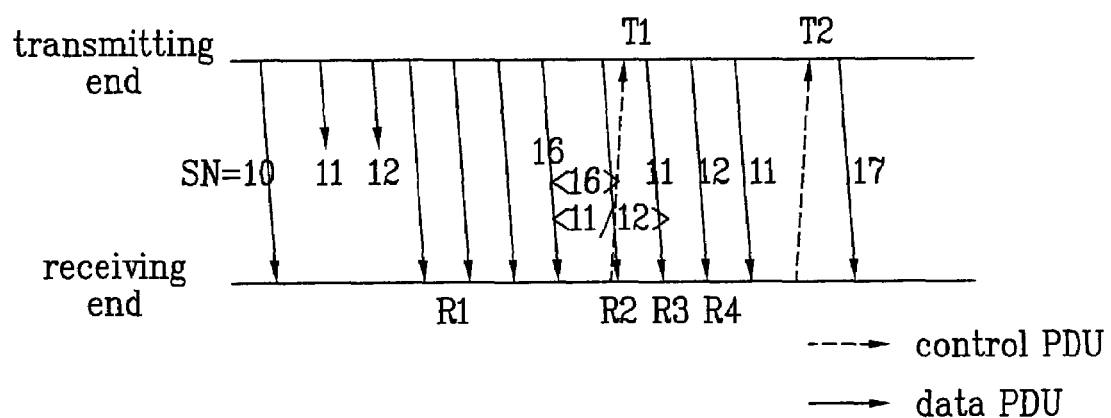
FIG. 4 illustrates a diagram for a data communication method of a delay response system according to a second embodiment of the present invention.

FIG. 4 illustrates a diagram for a data communication method of a delay response system according to a second embodiment of the present invention.

Shown in FIG. 4 is the case that packets to which SNs, 0 to N, are given respectively are forwarded using adaptive modulation.

Namely, shown is the case that a data transfer rate is changed by the variation of radio environments, while eleventh and twelfth packets among the packets forwarded from a transmitting end are being transferred, so as to lose the two packets. In this case, a receiving end determines the data transfer rate of the transmitting end for the variation of the radio environments so as to inform a data transfer rate that will be transmitted.

The receiving end forms a control PDU including control information for informing the transmitting end of the variation of a coding type, a SN(latest sequence number, LSN) of the lately received packet, and SNs(SN=11, 12 in FIG. 4) of the packets lost during transmission(packets failing to be received).

And, the receiving end decodes the packets, which are already received before receiving a response message for the control PDU, into a previous coding type before the change, and reassembles the received packets in a second layer of the receiving end so as to transfer the information included in the decoded packets to a higher layer.

Accordingly, the transmitting end primarily stops transmitting the packets after the LSN included in the control information based on the control information included in the received control PDU, and repeats retransmission of the lost packets included in the control information sequentially.

When the lost packets retransmitted from the transmitting end are normally received, the receiving end transfers a confirm message including information of informing a varied coding type to the transmitting end.

Accordingly, the transmitting end, when receiving the confirm message of the receiving end, forwards the rest packets after the LSN failing to be transmitted to the receiving end with a transfer rate according to the coding type included in the confirm message.

Figure 5:
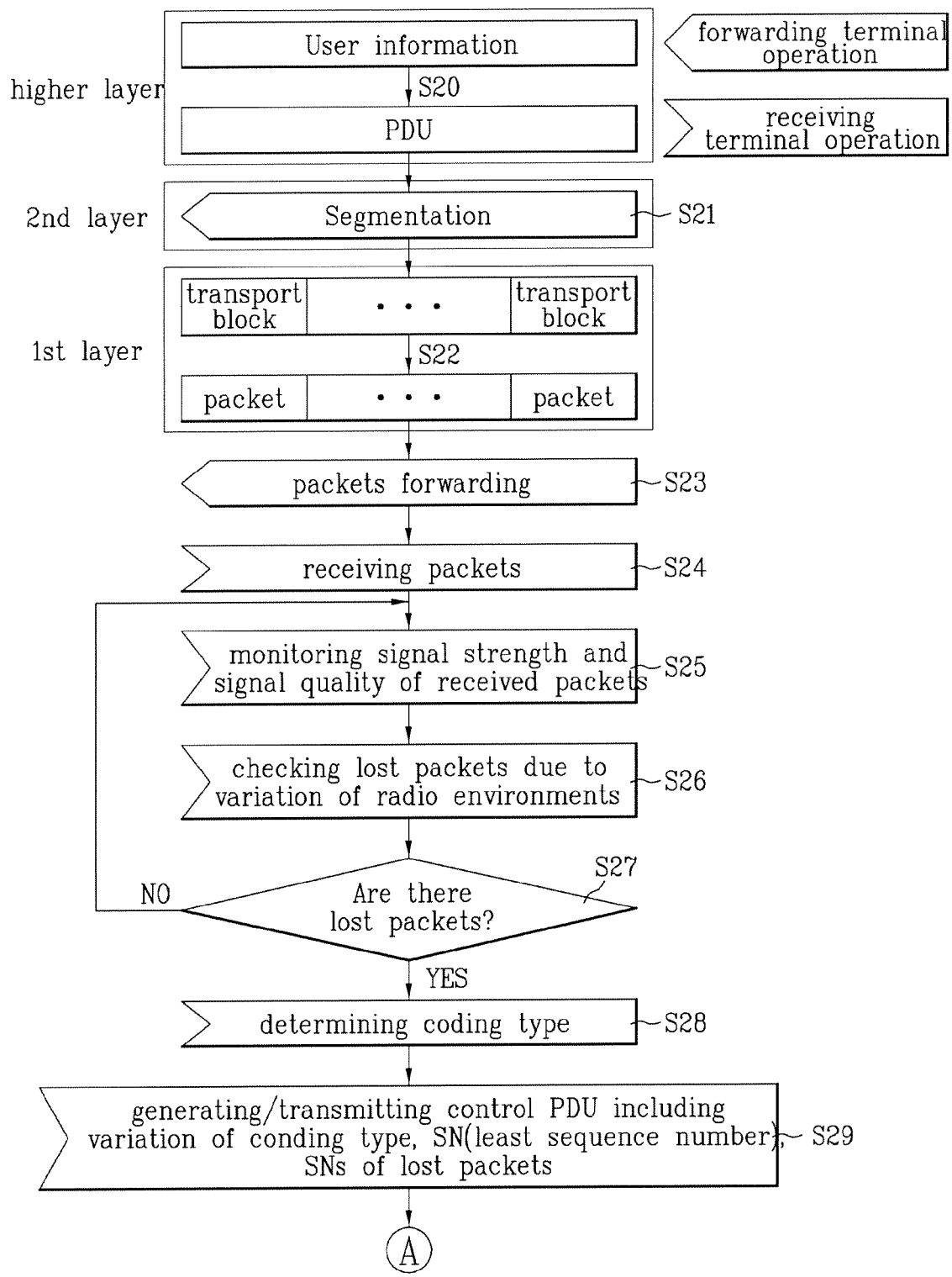
FIG. 5 illustrates a flowchart for a data communication method of a delay response system according to a second embodiment of the present invention.

FIG. 5 illustrates a flowchart for a data communication method of a delay response system according to a second embodiment of the present invention.

Referring to FIG. 5, as is the same explanation of FIG. 3, information to be transferred(user information) undergoes segmentation of a second layer so as to be fit to a current transfer rate after having been formed into a single PDU (protocol data unit) defined in a higher layer(S20, S21).

Thereafter, a first layer in direct charge of information transmission forms transmission packets from transport blocks divided by the segmentation(S22).

And, the packets are transmitted to a receiving end with a current transfer rate(S23).

The receiving end monitors signal strength and signal quality of the received packets while receiving the packets from a transmitting end(S24, S25). And, the receiving end checks lost packets due to the variation of radio environments based on the monitoring(S26).

If it is judged that there exist the lost packets due to the variation of the radio environments(S27), the receiving end determines a coding type suitable for the current radio environments (S28). This means that the receiving end determines the data transfer rate of the transmitting end.

The receiving end generates a control PDU(or control message) including the variation of the coding type, a SN(latest sequence number, LSN) of the lately received packet, and SNs(SN=11, 12 in FIG. 4) of the packets lost during transmission(packets failing to be received)(S29).

The receiving end keeps checking whether a response message for the control PDU(or control message) is received from the transmitting end(S30), and simultaneously, decodes the packets which are already received into a previous coding type before the change (S31). Moreover, The PDUs generated from the decoding of the packets are reassembled in a second layer of the receiving end so as to complete a single PDU(S32).

The transmitting end checks the received control PDU(or control message), and then transmits instantly a response message to the receiving end(S33, S34).

Accordingly, the transmitting end primarily stops transmitting the packets after the LSN included in the control information based on the control PDU(pr control message) (S35), and repeats retransmission of the lost packets included in the control PDU(or control message) sequentially(S36).

When the lost packets retransmitted repeatedly from the transmitting end are normally received(S37), the receiving end transfers a confirm message including a varied and determined coding type to the transmitting end(S38).

Accordingly, the transmitting end, when receiving the confirm message of the receiving end(S39), forwards the rest packets after the LSN failing to be transmitted to the receiving end with a transfer rate according to the coding type included in the confirm message(S40).

As explained in the above description, the data communication method according to the present invention brings about no delay of data transmission since reestablishment of an extra radio link connection is not required when a variation of the coding type according to adaptive modulation is demanded. Therefore, the present invention guarantees the security of information transmission as well as increases data transmission efficiency.

Moreover, the present invention is more effective in applying adaptive modulation such as GPRS(general packet radio service) as a data transmission standard.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of receiving downward link data transferred from a communication system with coding type determination in a user terminal, the method comprising:

a first step of monitoring variation of radio environments from the terminal receiving downward link packets sequentially;

a second step of informing the system of a coding type to be changed and sequence numbers of retransmission packets to be received by using the coding type after determining the coding type in accordance with the variation of the radio environments; and a third step of receiving sequentially the retransmission packets with a transfer rate in accordance with the coding type, wherein the second step is carried out so that the terminal informs the system the sequence numbers of the retransmission packets to be received with the transfer rate, wherein the terminal generates a control message including the coding type and the sequence numbers to be transmitted to the system, wherein the terminal generates the sequence numbers of packets except reassembled packets to be transferred from a second layer to a higher layer of the terminal.

2. The method of claim 1, wherein the system checks the transmitted control message and then transmits substantially instantly a response message corresponding to the control message to the terminal.

3. The method of claim 1, wherein the system regenerates the retransmission packets corresponding to the sequence numbers in accordance with the coding type included in the control message and forwards the regenerated retransmission packets with the transfer rate to the terminal.

4. The method of claim 3, further comprising the step of receiving repeatedly the regenerated retransmission packets that failed to be received by the terminal after having received a response message in response to the control message.

5. A downward link data receiving and transmitting method with coding type determination, the method comprising:

a first step of monitoring a variation of radio environments in a user terminal receiving downward link packets sequentially;

a second step of having the terminal determine a coding type to be varied in accordance with the variation of the radio environments if lost packets due to the variation of the radio environments among the downward link packets exist;

a third step of having the terminal transmit a control message for informing a variation of the coding type and the lost packets to a communication system; and a fourth step of having the system retransmit the lost packets repeatedly after having transmitted a response message corresponding to the control message of the terminal, wherein the third step is carried out in a manner that the terminal transmits the control message including the variation of the coding type, a latest sequence number of the packets received by the terminal, and sequence numbers of the lost packets to the system except the reassembled packets to be transferred from a second layer to a higher layer of the terminal, wherein the fourth step is carried out in a manner that the system stops transmitting the downward link packets after the last retransmitted packet is received by the terminal.

6. The method of claim 5, wherein the first step is carried out in a manner that the terminal receives the downward link packets and monitors signal strength and signal quality of the received downward link packets so as to check the lost packets due to the variation of the radio environments.

7. The method of claim 5, wherein the terminal decodes the already received downward link packets into a previous coding type before variation after having transmitted the control message.

8. The method of one of claim 5, wherein the system retransmits the lost packets to the terminal with a transfer rate in accordance with the varied and determined coding type.

9. The method of claim 5, after the fourth step, further comprising a step of informing the system of the coding type which is varied and determined by the terminal if the lost packets transmitted from the system are normally received.

10. The method of claim 9, wherein the system retransmits the lost packets to the terminal with a transfer rate in accordance with the varied and determined coding type.

* * * * *